April 12, 1960

F. C. SHOVIC 2,932,785

SERVO SYSTEM

Filed Aug. 6, 1956

Folke C. Shovic
INVENTOR

BY Kimmel & Crowell

ATTORNEYS

April 12, 1960
F. C. SHOVIC
2,932,785
SERVO SYSTEM
Filed Aug. 6, 1956
3 Sheets-Sheet 2
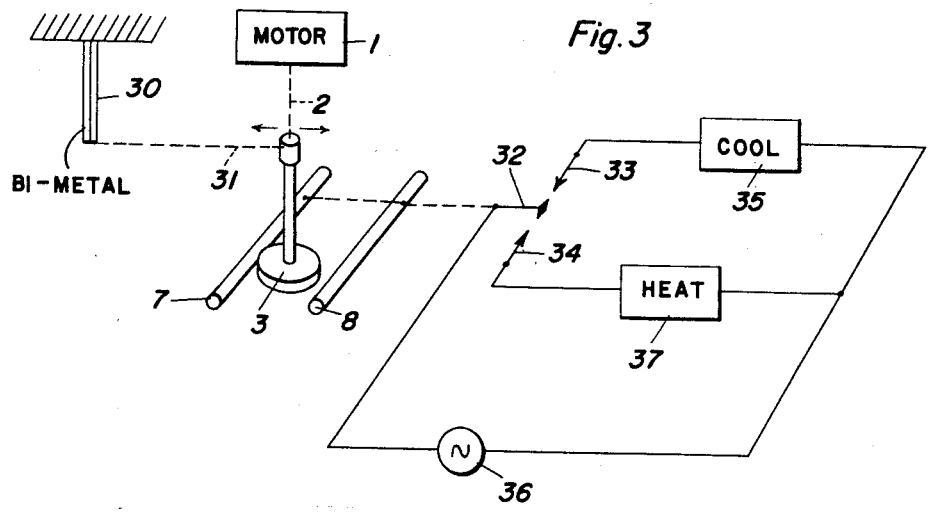
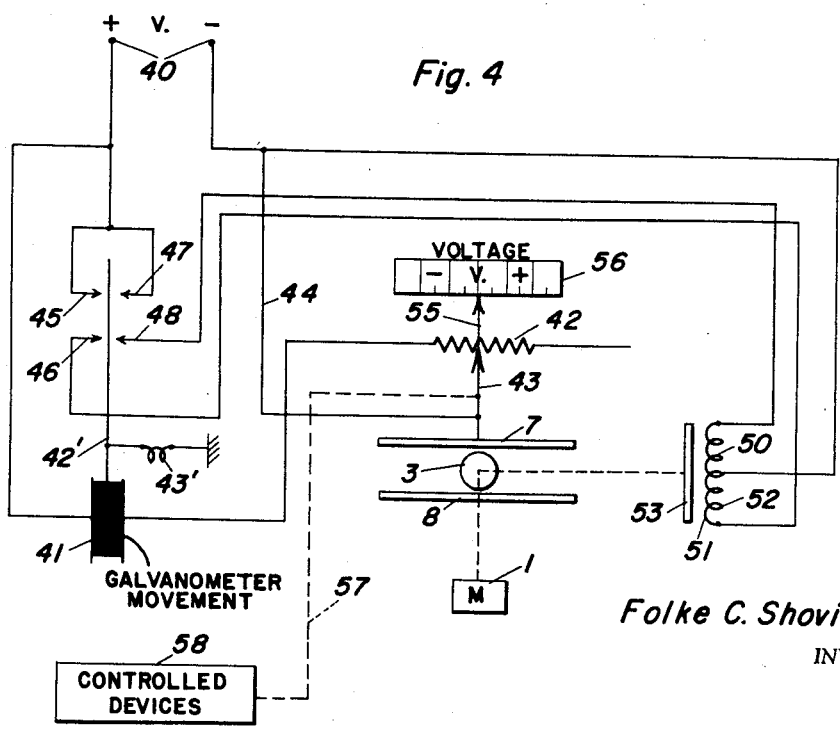
Folke C. Shovic
INVENTOR
BY Kimmel & Crowell
ATTORNEYS

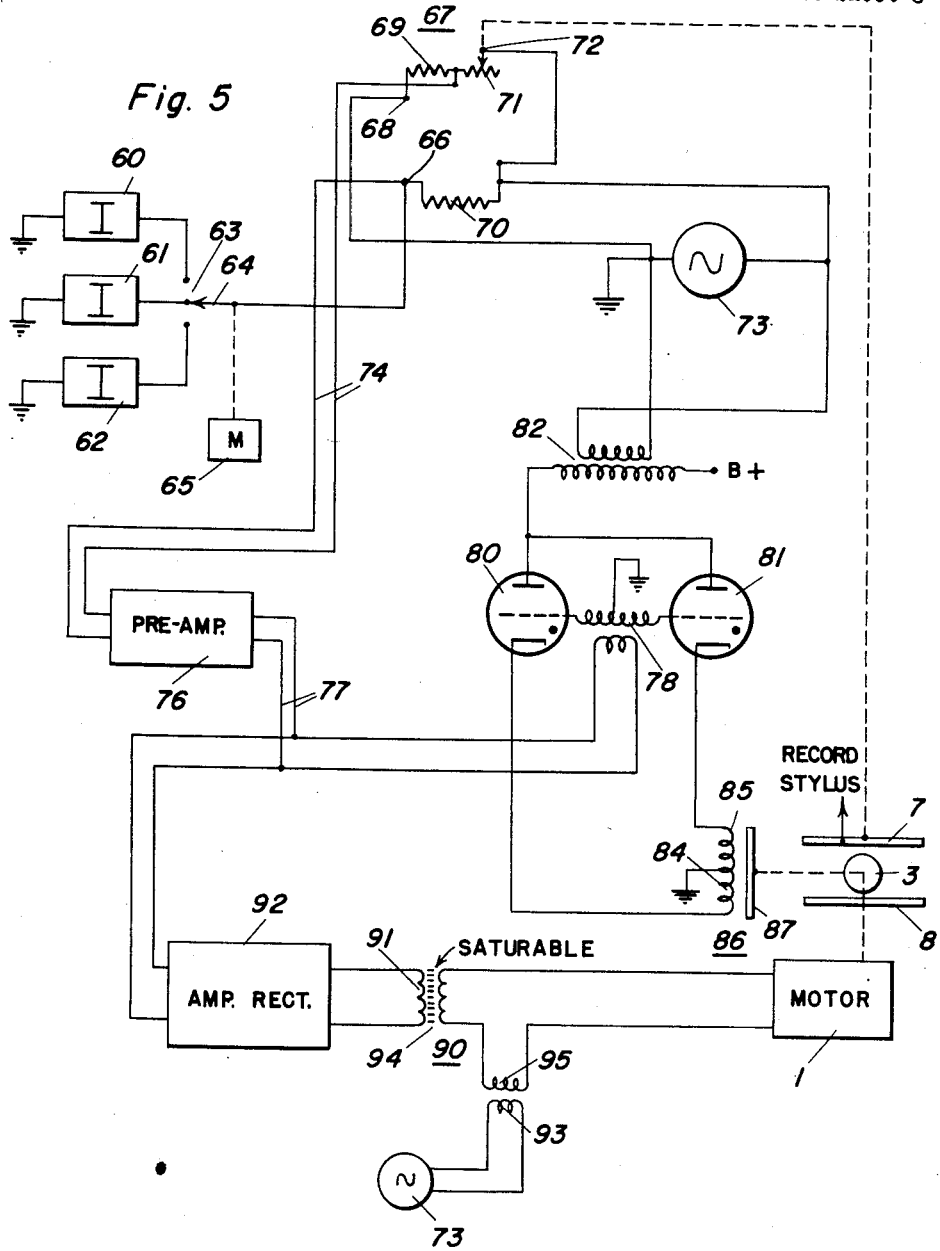

United States Patent Office 2,932,785
Patented Apr. 12, 1960

2,932,785

SERVO SYSTEM

Folke C. Shovic, Great Falls, Mont., assignor of twenty-five percent interest to John P. Wuerthner, Great Falls, Mont.

Application August 6, 1956, Serial No. 602,306

13 Claims. (Cl. 323—75)

The present invention relates generally to servo systems, and more particularly to servo systems of the rebalancing type, in which a reversible clutch is driven by an unidirectionally rotating motor and is controlled to drive a bidirectional translating member in response to control signal to establish balance of a servo bridge, and to effect other control, recording and indicating functions.

Describing now briefly a specific embodiment of the system, a unidirectionally rotating motor drives a clutch rotor always in the same direction. The clutch rotor may be displaced laterally in either of two directions in response to selective energization of a relay system. When displaced in one of two directions, the rotor couples with and drive in one direction a translating element, and when actuated in the alternative sense the rotor couples with and drive the translating member in the opposite direction. To this end the translating member possesses two rods extending parallel with the plane of the rotor, which lies between the rods, and which has a diameter slightly less than the spacing between the rods, so that in a normal declutched condition no drive will exist. The translating member actuates a slider arm of a Wheatstone bridge, to which is supplied input signal from any desired source and the unbalance signal of the bridge is supplied to the clutch control relays. The system is so arranged that the motion of the translating member under control of the clutch rotor tends to effect rebalance of the bridge. The translating member may be utilized to drive a recording stylus, in a recording system, or in the alternative may be utilized to control valves, electrical circuits, or the like.

It is accordingly a first broad object of the present invention to provide a novel system of the Wheatstone bridge rebalancing servo type.

It is another object of the present invention to provide a servo system having no overshoot, and which is capable of rapid response.

It is still another object of the invention to provide a servo system including a continuously running reversible motor which may drive the translating member in either of two directions in accordance with the character of a control signal.

Still a further object of the invention resides in the provision of a system for controlling a relatively heavy switch to either of two positions, in response to slight motion of a sensitive bimetallic strip or other deflectable member.

A further object of the invention resides in a system for maintaining constant current flow in a circuit, by utilizing a servo system arranged in accordance with the invention, to introduce into the system variable amounts of control resistance.

Still a further object of the invention resides in a time sharing system for recording rapidly a plurality of measured quantities by means of a system of the rebalancing type, including therein a rapidly acting clutch system which is constructed in accordance with the invention.

The above and still further features, objects, of the invention will become apparent upon consideration of the following detailed disclosure of various specific embodiments of the invention, wherein:

Figure 3 is a schematic representation of a system for controlling a heavy switch in response to slight motion of a bimetallic strip.

Figure 4 is a schematic representation of a controlled system in accordance with the invention.

Figure 5 is a schematic representation of a time sharing system for measuring and recording the values of a plurality of measured quantities.

Figure 1:
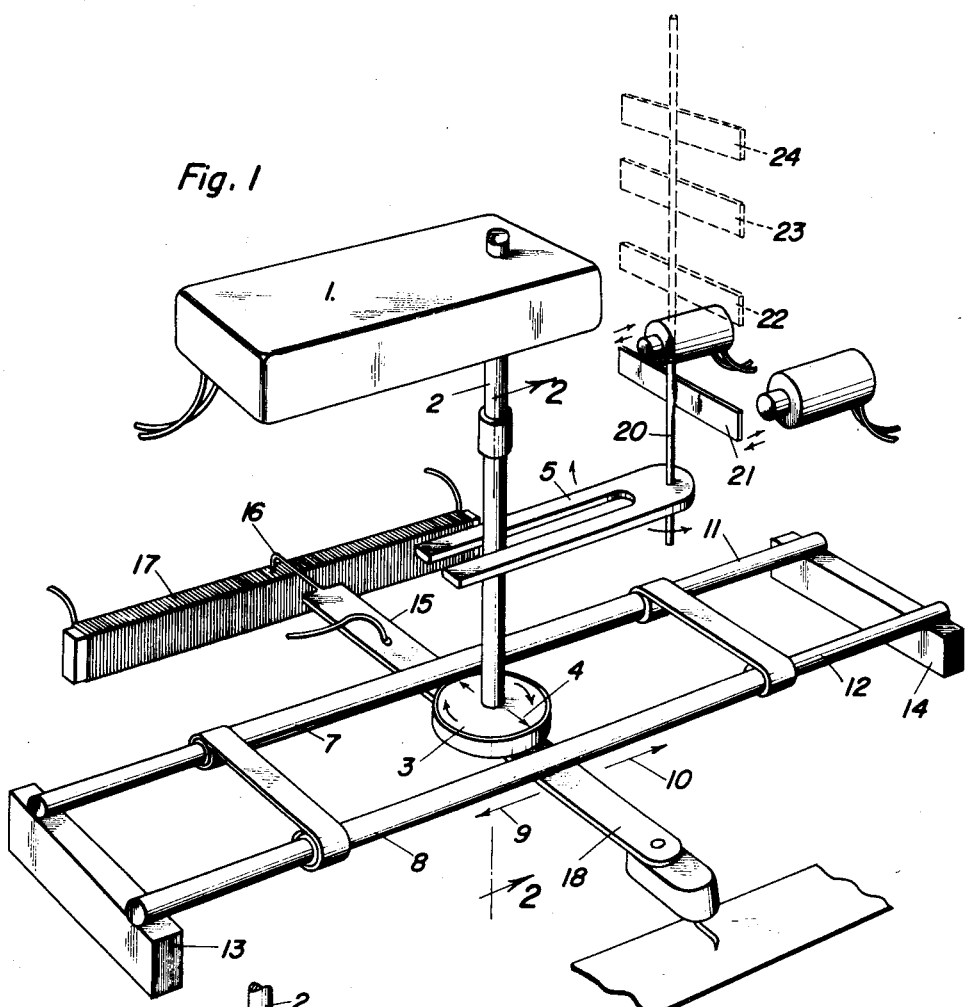
Figure 1 is a view in perspective of the mechanical features of the invention.
Figure 2:
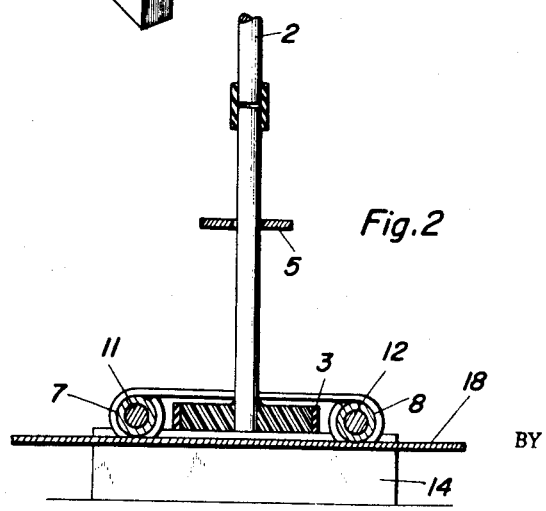
Figure 2 is a partial view in plan of the system of Figure 1.

Referring now more particularly to Figures 1 and 2 of the accompanying drawings, the reference numeral 1 denotes a drive, including a motor, directly coupled to a shaft 2, or coupled thereto by means of a belt if desired, shaft 2 terminating in a rubber covered plastic rotor disc 3. Shaft 2 is arranged to permit transverse motion, in the directions of the arrows 4, and in response to relatively slight applied force. Motion of the rotor 3 in the directions of the arrows 4 is accomplished in response to pivotal motion of a forked member 5 which embraces the shaft 2, so that pivotal motion in opposite directions of the forked member 5 causes motion of the rotor 3 in alternative directions, without changing the plane of the rotor 3 substantially. Rotor 3 is located between two tubular rods 7 and 8, which are separated by a distance slightly greater than the diameter of the rotor 3, and subsist in the same plane as the rotor 3. Accordingly, the amount of play between the rotor 3 and the tubular rods 7 and 8 is such that slight motion of the rotor 3 in either direction will accomplish coupling of the rotor 3 to the rods alternatively. It will be clear, since the rotor 3 is rotating always in the same direction, that when the rotor 3 is clutched to the rod 8, that the rod 8 will translate in one direction, i.e., in the direction of the arrow 9, while when the rotor 3 is clutched to the rod 7 the direction of motion of the rod 8 will be opposite, i.e., in the direction of the arrow 10.

Rods 7 and 8 slide on two stationary supporting rods 11 and 12, respectively, which are supported by cross bars 13 and 14. Transversely extending bar 15, secured to the rod 7, includes a slider 16 which slides over a resistance wire 17 constituting one arm of a Wheatstone bridge. A further transversely extending arm 18 supports a stylus of a recording system. The recording system includes a paper drive mechanism, paper being moved as a function of time, either uniformly, or in accordance with some desired function, and the recording stylus moves transversely of the paper as the rods 7 and 8 are actuated in one direction or the other.

The forked member 5 may be pivoted by means of a shaft 20 extending therefrom, on which may be secured a plurality of actuating members 21, 22, 23, 24. The latter may take any desired form, and may be responsive to force supplied in any desired manner. For example, the rods may constitute magnetic armatures, or may be responsive to air pressure, vacuum, spring pressure, or the like.

The systems of Figures 1 and 2 are basic to the present invention, and are employed in the several embodiments thereof which are schematically represented in Figures 3, 4 and 5 of the accompanying drawings. Accordingly, in the latter figures of the drawings the representation of the servo mechanism of Figures 1 and 2 is schematic, for purposes of simplifying the representation and clarifying the system features of the systems.

Referring now more particularly to Figure 3 of the accompanying drawings, the reference numeral 30 represents a bimetallic strip, which deflects in one sense in response to an increase in temperature and in the opposite sense in response to a decrease in temperature. It is frequently desired to utilize such a strip to control a circuit. The strip itself may, however, be quite fragile and may be capable of generating only slight forces. If the main circuit controlling device is required to be a relatively heavy switch, some intermediate power amplifying system is required.

In accordance with one embodiment of the present invention, a bimetallic strip 30 controls the position of clutch rotor 3, which is continually driven by means of motor 1, and which may be moved slightly in its own plane in either of two directions by means of a mechanical linkage 31 of any desired type, existing between the bimetallic strip 30 and the draft shaft 2. To the rod 8 is secured a switch contact 32, which is translatable into contact with stationary contacts 33 or 34, according as the movable contact 32 is moved in one direction or the other. Closure of the circuit between contacts 32 and 33 completes a circuit to a cooling device 35 from a power source 36. Closure of a circuit between contacts 32 and 34 completes circuit to a heating device 37 from the power source 36.

In operation, movement of the bimetallic strip 30 in one direction or the other, in response to temperature variation, effects clutching of the rotor 3 to either the rod 7 or the rod 8, in accordance with the direction of motion of the bimetallic strip 30. When the rotor 3 is clutched to the rod 8, the switch 32 moves toward the contact 33, while when the rod 8 moves in the opposite direction, the switch contact 32 moves into contact with the stationary switch contact 34. The system is so arranged that the effect of operation of the cooling source 35 and the heating source 37 is to move the bimetallic strip 30 back to its normal position. Accordingly, the system is of the rebalancing type and employs the clutch mechanism of Figures 1 and 2 as a controlling element for actuating a relatively heavy switch comprising the movable contact 32 and the stationary contacts 33, 34, in response to extremely slight force applied by the metallic strip 30, as a deflecting force, to the drive shaft of the rotor 3.

Referring now more particularly to Figure 4 of the accompanying drawings, the reference numeral 40 denotes a source of electric current. The source may comprise a measuring system, or may comprise a power line, or may be of any desired variety known in the art. One terminal of source 40 is connected to a meter movement 41, and thence through a resistance 42 to a slider 43. The slider 43 is connected by a line 44 back to the other terminal of the source 40. Accordingly, the total current which can flow between the terminals of the source 40 is determined by the setting of the slider 43, which determines the quantity of resistance in series with the circuit. At the same time, the magnitude of current flow is measured by the meter movement 41, which includes a pointer 42', of conductive material, and which is biased by means of a spring 43' or in some other convenient manner, to assume a neutral position in response to some predetermined current flow in the circuit. The arm 42' lies between two sets of switch contacts 45, 46, and 47, 48.

When the meter movement 41 swings counterclockwise a circuit is completed between the contacts 45 and 46, while when the meter movement 41 swings clockwise, a circuit is completed between the contacts 47 and 48. As long as the meter movement 41 is in neutral position, there is no completed circuit between contacts 45, 46 or between contacts 47 and 48. Contacts 45 and 47 are directly connected to one terminal of the source 40. Contact 46 is connected to one side of a differential relay winding 50 of a differential relay 51, while contact 48 is connected to the other winding 52 of the relay 51. The center terminal of the relay 51 is connected back to the other side of the source 40. Accordingly, motion of the meter movement 41 in one sense or the other affects energization of one or the other of the windings 50, 52 of the differential relay 51, while neutral position of the meter movement 41 leaves both windings 50 and 52 unenergized. The differential relay 51 includes a pivoted armature 53 which pivots in one sense or the other according as winding 50 or 52 has been energized. The armature 53 controls the position of rotor 3 and the translatory arm 7 controls the position of the slider 43 along the resistance 42. The tendency of the system accordingly is to adjust the position of a slider 43 on the resistance 42 so that the meter pointer 41 arrives at neutral position. Motion of the meter position 41 in one sense or the other effects clutching of the rotor 3 to either the rod 7 or the rod 8, in accordance with the direction of a motion of the meter movement 41.

The system is so arranged that the direction of motion of the rods 7 and 8 when clutched to the rotor 3 tends to effect rebalance of the system. The slider 43 may drive a pointer 55 which moves with respect to a scale 56. Visual observation of the position of the pointer 55 with respect to the scale 56 enables determination of the voltage of the terminals of the source 40, i.e., if the voltage of the source 40 should increase, the position of the slider 43 will compensate for this decrease by introducing further resistance into the circuit, the further resistance tending to make the current flow of normal amount. The position of the slider 55 accordingly represents the voltage applied at the terminals 40. If desired, the slider 43 may be mechanically coupled by means of a coupling device 57 to control devices or elements 58 of any desired character, such as valves, rheostats, or the like.

Referring now more specifically to Figure 5 of the accompanying drawings, there is provided a plurality of information sources 60, 61, and 62, which may be of a wide variety of types. For example, the information sources may be thermosensitive resistances, or strain responsive resistances. One side of each of the sources 60, 61, 62 is grounded and the other sides are connected respectively to the stationary contacts of a selector switch 63, which has a movable arm 64. The movable arm 64 is scanned over the stationary contacts of the switch 63 by means of a motor 65, at any convenient rate. The arm 64 is connected to one terminal of a Wheatstone bridge 66, the adjoining terminal 68 of which is grounded. The Wheatstone bridge 67 includes additional arms, so that the information source 60, 61, 62, which is then connected in circuit by the switch 63 forms one arm of the bridge 67. The other arms of the bridge 67 comprise resistances 69 and 70, of constant value, and a variable resistance 71, the value of which is controlled in response to the setting of a slider 72. The source of voltage 73 is connected across one side of the bridge, while the complementary side of the bridge is connected to a pair of lines 73. It follows that an A.C. voltage at the frequency of the source 73 appears on the lines 74, when the bridge is unbalanced, the phase of that voltage being a function of the direction in which the unbalance occurs, and that for complete balance the total voltage on the lines 74 is zero. The signal supplied by the bridge via lines 74 is applied to a preamplifier 76, having output lines 77. The lines 77 are connected to a primary winding of a transformer 78.

A pair of control Thyratrons is provided, identified by the reference numerals 80 and 81, each of which includes an anode, a control grid, and a cathode. The primary winding 78 is center grounded, and drives a center-grounded secondary winding of transformer 78, which is connected in push-pull relation to the grids of the Thyratrons 80 and 81. The anodes of the Thyratrons 80 and 81 are driven in parallel relation by means of a transformer 82, energized from a source 72. The cathode circuit of the Thyratron 80 includes a relay winding 84, and the cathode circuit of the Thyratron 81 a relay winding 85 of a differential relay 86, the center point of which is grounded. Accordingly, the differential relay windings 84, 85 are differentially energized in accordance with the phase of the voltage applied to the grids of the Thyratrons 80 and 81 by the transformer 78. The firing times of the Thyratrons is in turn in a function of the relative phases of the anode and control grid voltages, as supplied by the transformers 78 and 82, and while the phase of the signal supplied to the transformer 82 remains constant, since it derives from the source 73, the phase of the signal supplied to the transformer 78 is reversible in accordance with the sense of unbalance of the Wheatstone bridge 67. It follows that one or another of the Thyratrons 80, 81 will be fired, or will fire predominantly, and accordingly that the differential relay 86 will be differentially energized in accordance with the sense of unbalance of the Wheatstone bridge 67. The differential relays 84, 85 control an armature 87, which in turn controls the position of a clutch rotor 3 with respect to translatory rods 7 and 8. The rod 7 may be mechanically coupled to a recording stylus, forming part of a conventional paper strip recording machine, and accordingly records the information supplied by the sources 60, 61 and 62.

The rotor 3, which is driven by the motor 1, may be speed controlled from the output of the preamplifier 76, as well as driven from the source of supply 73. To this end a multi-winding transformer is employed, one primary winding 91 of which is connected at the output of a power amplifier and rectifier 92, which is driven from the leads 77. The other primary 93 is driven from the source 73. The secondary windings 94, 95 are connected in series to the motor 1. The motor 1 is then supplied with a normal current, from source 73. The windings 91, 94 are wound on a saturable core, so arranged that any increase of output from amplifier 92 decreases the impedance of winding 94, and hence increases motor power, and increases motor speed. Rebalancing action is thus accelerated, especially for large unbalances, but the accelerating effect decreases as rebalance is approached, and vanishes when it is attained.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What is claimed is:

1. A servo system including a bridge, means for unbalancing said bridge, and means for rebalancing said bridge, said last means including a mechanically movable element, said mechanically movable element including two parallel bars, a clutch rotor located intermediate said bars and normally out of clutching engagement with both said bars and movable in a plane containing said bars into clutching engagement with either of said bars selectively, means for moving said rotor selectively into said engagement comprising a signal responsive device, said bridge having an input circuit for control signal, and an output circuit connected to said signal responsive device, and means for rotating said clutch rotor always in the same direction.

2. A servo system, comprising a device for translating unidirectional rotary motion to translatory motion in either of two directions, said device comprising a pair of parallel rods movable in the direction of their length in either of two directions, a rotor rotating always in the same sense, said rotor having a rim, and selective means for selectively bringing said rim into clutching engagement with either of said rods and for declutching said motor from both said rods, a device for effecting a measurement, and means responsive to said device for effecting a measurement for controlling said means for selectively bringing said rim into clutching engagement with either of said rods and for declutching said rotor from both said rods.

3. A servo system, comprising means for translating directional rotary motion to translatory motion in either of two directions comprising a pair of rods movable in the direction of their length in either of two directions, a rotor rotating always in the same sense, said rotor having a rim, and selective means for selectively bringing said rim into clutching engagement with either of said rods and for declutching said rotor from both said rods, a bridge circuit, a measuring device connected in one arm of said bridge, a rebalancing impedance connected in another arm of said bridge circuit, means for controlling said rebalancing impedance in accordance with the position of said rods, and means for controlling said selective means in accordance with bridge condition to declutch said rotor on balance and to selectively clutch said rotor to one or the other of said rods in accordance with sense of bridge unbalance.

4. The combination in accordance with claim 3, wherein is provided an electric drive motor for said rotor, and means for controlling the speed of said drive motor in accordance with said bridge condition.

5. A servo system, comprising means for translating unidirectional rotary motion to translatory motion in either of two directions comprising a pair of parallel rods movable in the direction of their length in either of two directions, a rotor rotating always in the same sense, said rotor having a rim, and selective means for selectively bringing said rim into clutching engagement with either of said rods and for declutching said rotor from both said rods, a mechanically deflectable measuring device, said selective means mechanically responsive to deflection of said mechanically deflectable measuring device.

6. The combination in accordance with claim 5, wherein said measuring device is a bimetallic strip, and wherein means are provided for mechanically linking said strip and said selective means.

7. The combination in accordance with claim 6, wherein is provided a switch having a contact movable selectively into engagement with two stationary contacts, and means securing said movable contact in coupled relation to said rods, for movement thereby.

8. A servo system, including means for translating unidirectional rotary motion to translatory motion in either of two directions, comprising a pair of parallel rods movable in the direction of their length in either of two directions, a rotor rotating always in the same sense, said rotor having a rim, and selective means for selectively bringing said rim into clutching engagement with either of said rods and for declutching said rotor from both said rods, a source of variable voltage, a variable resistance in series with said source of voltage and a current responsive meter movement in series with said source of voltage, with said meter movement and with said resistance, two switch means selectively closable in response to alternative deflection of said meter movement, means selectively responsive to closure of said switches, respectively, for controlling said selective means, and means for controlling the resistance value of said variable resistance in response to motion of said rods.

9. A servo system, comprising means for translating unidirectional rotary motion to translatory motion in either of two directions, comprising a pair of parallel rods movable in the direction of their length in either of two directions, a rotor rotating always in the same sense, said rotor having a rim, and selective means for selectively bringing said rim into clutching engagement with either of said rods and for declutching said rotor from both said rods, a Wheatstone bridge having four arms, a source of reference A.C. voltage connected to input terminals of said bridge, a first variable resistance in one arm of said bridge, a second rebalance variable resistance in another arm of said bridge, an output circuit for said bridge in which flows output signal of the frequency of said reference source and of magnitude and phase in accordance with the balance condition of said Wheatstone bridge, a differential relay system, means for differentially energizing said relay in accordance with the phase and magnitude of said output signal, means responsive to said relay for controlling said selective means to declutch said rotor from both said rods in response to balanced relation of said relay system and to selectively clutch said relay to said rods in accordance with the differential energization of said relay system, and means for controlling said rebalance resistance in accordance with position of said rods in such sense as to maintain balance condition of said bridge.

10. The combination in accordance with claim 9 wherein is provided an electric motor for driving said rotor, and means for varying the speed of said motor as a function of extent of unbalance of said bridge.

11. The combination in accordance with claim 10 wherein is provided means for establishing a minimum speed for said motor.

12. The combination according to claim 2, wherein said rotor is a disc having a plane in the plane of said parallel rods and located between said parallel rods.

13. The combination according to claim 10, wherein said means for selectively bringing said rim into clutching engagement includes a pair of electromagnets, means responsive to selective energization of said electromagnets for bringing said rim into engagement selectively with said rods, said rim normally and in the unenergized condition of both said electromagnets being out of clutching engagement with both said rods.

References Cited in the file of this patent

UNITED STATES PATENTS

| | | |
|---|---|---|
| 597,200 | Kramme | Jan. 11, 1898 |
| 1,540,121 | Hammond | June 2, 1925 |
| 1,842,368 | Honiss | Jan. 19, 1932 |
| 1,844,973 | Ports | Feb. 16, 1932 |
| 2,024,385 | Persons | Dec. 17, 1935 |
| 2,173,798 | Boak | Sept. 19, 1939 |
| 2,271,207 | Rhein | Jan. 27, 1942 |
| 2,468,453 | Mallentjer | Apr. 26, 1949 |
| 2,751,028 | Laughlin | June 19, 1956 |